US011794521B2

United States Patent
Keich (10) Patent No.: US 11,794,521 B2
(45) Date of Patent: Oct. 24, 2023

(54) RETRACTABLE FURNITURE CASTER SYSTEM

(71) Applicant: Gross Point Woods LLC, Wilmette, IL (US)

(72) Inventor: John Keich, Wilmette, IL (US)

(73) Assignee: Gross Point Woods LLC, Wilmette, IL (US)

( * ) Notice: Subject to any disclaimer, the term of this patent is extended or adjusted under 35 U.S.C. 154(b) by 0 days.

(21) Appl. No.: 17/579,338

(22) Filed: Jan. 19, 2022

(65) Prior Publication Data

US 2022/0227172 A1   Jul. 21, 2022

Related U.S. Application Data (60) Provisional application No. 63/139,251, filed on Jan. 19, 2021.

(51) Int. Cl.
  *B60B 33/06* (2006.01)
  *B60B 33/00* (2006.01)
  *A47B 91/00* (2006.01)

(52) U.S. Cl.
  CPC .......... *B60B 33/063* (2013.01); *A47B 91/002* (2013.01); *B60B 33/0002* (2013.01); *B60B 33/0044* (2013.01)

(58) Field of Classification Search
  CPC ..... B60B 33/06; B60B 33/063; A47B 91/002; E05B 53/001
  See application file for complete search history.

(56) References Cited

U.S. PATENT DOCUMENTS 823,468 A * 6/1906 Hendricks ............... B60B 33/06
  16/33
1,007,022 A * 10/1911 Doll ....................... A47C 7/006
  280/43.17

(Continued)

FOREIGN PATENT DOCUMENTS

CN      204336323        5/2015
CN      108825982 A      11/2016

OTHER PUBLICATIONS

Screen captures from YouTube video clip entitled "Concealed Wheeled Furniture Carrying Systems," 8 pages, uploaded on Apr. 23, 2015 by user "Ahmet Aslantaş." Retrieved from Internet: <https://www.youtube.com/watch?v=UWwYL6glTnE>.

(Continued)

*Primary Examiner* — Jeffrey O'Brien
(74) *Attorney, Agent, or Firm* — LEE SULLIVAN SHEA & SMITH LLP (57) ABSTRACT

An example article of furniture includes a number of furniture legs having mechanically coupled thereto a respective furniture caster having a rolling component. The furniture casters are movable between (i) an extended position in which their rolling components at least partially extend below bottom surfaces of the furniture legs and (ii) a retracted position in which their rolling components are positioned entirely above the bottom surfaces of the furniture legs. Push-pull cables are mechanically coupled to the furniture casters, and at least one actuator is mechanically coupled to the push-pull cables. When actuated, the actuator applies a pushing force to the push-pull cables, thereby causing the furniture casters to transition from the retracted position to the extended position. When the actuator is not actuated, the pushing force is removed from the push-pull (Continued)

cables, thereby causing the furniture casters to transition from the extended position to the retracted position.

20 Claims, 4 Drawing Sheets

(56) References Cited

U.S. PATENT DOCUMENTS

| | | | | |
|---|---|---|---|---|
| 1,016,745 | A * | 2/1912 | Henrikson | B60B 33/06 16/32 |
| 1,022,646 | A * | 4/1912 | Toll | B60B 33/06 16/32 |
| 1,092,220 | A * | 4/1914 | Koch et al. | B60B 33/063 16/34 |
| 1,156,287 | A * | 10/1915 | Harris | B60B 33/06 16/33 |
| 2,655,387 | A | 10/1953 | Cramer | |
| 2,774,986 | A | 12/1956 | Moorehouse | |
| 2,788,219 | A * | 4/1957 | Mcclellan | B60B 33/06 280/43.15 |
| 3,363,725 | A * | 1/1968 | Lorrance | B60B 33/06 108/130 |
| 5,876,173 | A * | 3/1999 | English, Jr. | B60B 33/066 254/8 R |
| 5,957,649 | A * | 9/1999 | English, Jr. | B60B 33/0049 254/8 R |
| 6,079,931 | A * | 6/2000 | English, Jr. | B60B 33/0049 254/8 R |
| 9,603,764 | B2 * | 3/2017 | Turturro | B60B 33/0049 |
| 10,759,222 | B2 * | 9/2020 | Libakken | B60B 33/0047 |
| 11,122,887 | B1 * | 9/2021 | Haupt | B60B 19/14 |
| 11,166,559 | B1 * | 11/2021 | Kadoch | B60B 33/04 |
| 11,266,241 | B2 * | 3/2022 | Timenes | A47B 91/16 |
| 2005/0120518 | A1 * | 6/2005 | Thompson | E05D 15/0669 16/320 |
| 2016/0339742 | A1 | 11/2016 | Libakken | |
| 2019/0357680 | A1 * | 11/2019 | Timenes | F16M 3/00 |
| 2020/0390208 | A1 * | 12/2020 | Shah | A45C 5/146 |
| 2022/0162793 | A1 * | 5/2022 | Papsdorf | D06F 39/001 |

OTHER PUBLICATIONS

Screen captures from YouTube video clip entitled "Retractable Wheels on Adjustable Electric Beds," 5 pages, uploaded on Aug. 14, 2013 by user "Bakare Beds Ltd." Retrieved from Internet: < https://www.youtube.com/watch?v=c2zhC6fBT-E >.

International Searching Authority, PCT International Search Report and Written Opinion, PCT International Application No. PCT/US2022/012977, dated Apr. 8, 2022, 8 pages.

* cited by examiner

FIG. 4

RETRACTABLE FURNITURE CASTER SYSTEM

CROSS-REFERENCE TO RELATED APPLICATION

This application claims the benefit under 35 U.S.C. § 119 of U.S. Provisional Patent App. No. 63/139,251, filed Jan. 19, 2021, which is incorporated herein by reference in its entirety.

BACKGROUND

In recent years, there has been a trend in the furniture design industry to improve the mobility of furniture for use in multi-functional, temporary use, or flex spaces. For example, in the context of rental apartment furniture designs, there has been a trend of converting a stationary kitchen island to a movable kitchen island table in new apartment developments. One reason for this is to provide better flexibility within the dwelling unit for alternative uses of the kitchen island, such as using the island as a food preparation table, a dining table, a desk, an entertaining bar, a crafts table, or various other uses. Given this trend, there continues to be a need to develop furniture with better mobility so that the furniture can be more easily moved throughout the dwelling to serve multiple different functions.

Overview

Disclosed herein is new technology for providing improved mobility to an article of furniture.

In one aspect, the disclosed technology may take the form of a system comprising: (i) a plurality of furniture caster assemblies, each furniture caster assembly of the plurality of furniture caster assemblies respectively comprising (a) a housing comprising one or more side walls defining an interior space of the housing, wherein the housing is configured to mechanically couple to a respective furniture leg of an article of furniture comprising a plurality of legs, (b) a furniture caster comprising at least one rolling component, wherein the furniture caster is positioned at least partially within the interior space of the housing and movable between an extended position in which the at least one rolling component at least partially extends outside of the interior space of the housing and a retracted position in which the furniture caster is retracted further into the interior space of the housing relative to the extended position, and (c) a push-pull cable mechanically coupled to the furniture caster; and (ii) at least one actuator mechanically coupled to the push-pull cables, wherein the actuator is configured to (a) when actuated, apply a pushing force to the push-pull cables, thereby causing the furniture casters to transition from the retracted position to the extended position and (b) when not actuated, remove the applied pushing force from the push-pull cables, thereby causing the furniture casters to transition from the extended position to the retracted position.

In another aspect, the disclosed technology may take the form of an article of furniture comprising: (i) a plurality of furniture legs each comprising a respective bottom surface configured to interface with a floor or ground surface; (ii) a plurality of furniture caster assemblies, each furniture caster assembly of the plurality of furniture caster assemblies respectively comprising (a) a housing comprising one or more side walls defining an interior space of the housing, wherein the housing is mechanically coupled to a respective furniture leg of the plurality of legs, (b) a furniture caster comprising at least one rolling component, wherein the furniture caster is positioned at least partially within the interior space of the housing and movable between an extended position in which the at least one rolling component at least partially extends below the respective bottom surface of the respective furniture leg and a retracted position in which the at least one rolling component is positioned entirely above the respective bottom surface of the respective furniture leg, and (c) a push-pull cable mechanically coupled to the furniture caster; and (iii) at least one actuator mechanically coupled to the push-pull cables, wherein the actuator is configured to (a) when actuated, apply a pushing force to the push-pull cables, thereby causing the furniture casters to transition from the retracted position to the extended position and (b) when not actuated, remove the applied pushing force from the push-pull cables, thereby causing the furniture casters to transition from the extended position to the retracted position.

One of ordinary skill in the art will appreciate these as well as numerous other aspects in reading the following disclosure.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

The drawings are for the purpose of illustrating example embodiments, but those of ordinary skill in the art will understand that the technology disclosed herein is not limited to the arrangements and/or instrumentality shown in the drawings.

DETAILED DESCRIPTION

As noted above, disclosed herein is new technology for providing improved mobility to an article of furniture. Existing techniques for improving the mobility of furniture may involve affixing a set of casters to the legs of the furniture. However, this technique may negatively impact the design aesthetic of the furniture. For instance, some consumers may find the visual appearance of casters to be unappealing. To help address these or other issues, the technology disclosed herein is directed toward a retractable furniture caster system that allows the casters to transition to an extended position for rolling on the ground when it is desirable to move the furniture to a new location, and allows the casters to transition to a retracted position when it is no longer desirable to move the furniture. While in the retracted position, the casters may be out of sight so that they do not affect the design aesthetic of the furniture.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Retractable Furniture Caster Systems

Figure 1:
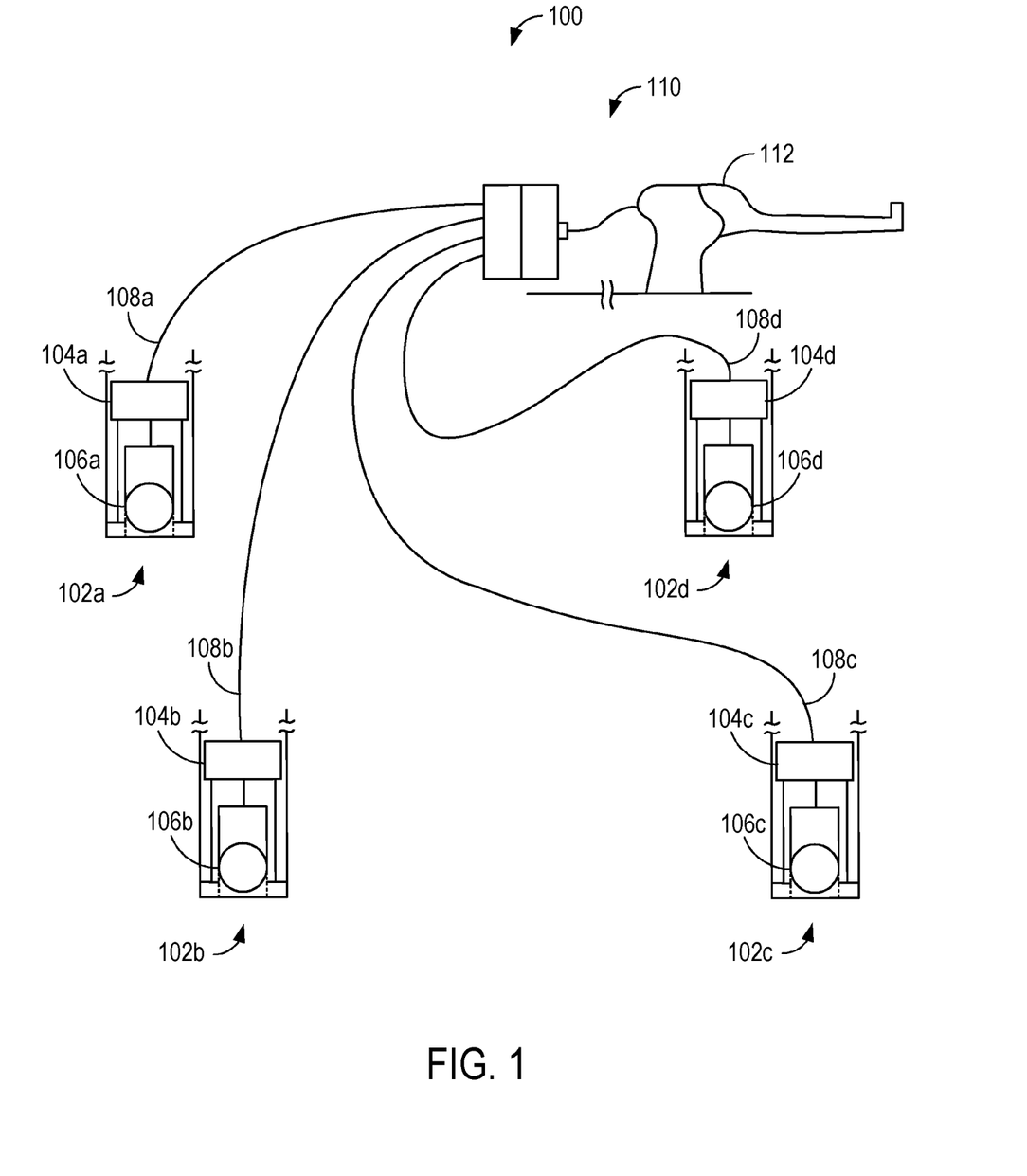
FIG. 1 depicts a retractable furniture caster system according to an example embodiment.

Turning now to the figures, FIG. 1 depicts an example retractable furniture caster system 100 that may be used to improve the mobility of an article of furniture. As used throughout this disclosure, the term "caster" refers to any rolling component that can be mounted to an article of furniture and used for the support and movement of the article of furniture, and the term "rolling component" refers to a wheel, a rotating ball (e.g., roller ball), or any other rollable component that can be used in a caster for the support and movement of an article of furniture. The retractable furniture caster system 100 may be a standalone system that a consumer may separately install into an existing article of furniture, or the retractable furniture caster system 100 may be integrated into an article of furniture as part of the manufacturing process of the furniture. The retractable furniture caster system 100 may be integrated with various types of furniture including, but not limited to, tables, chairs, desks, cabinets, dressers, bookcases, or beds.

As shown, the retractable furniture caster system 100 includes a number of caster assemblies 102 including caster assembly 102*a*, caster assembly 102*b*, caster assembly 102*c*, and caster assembly 102*d*. While FIG. 1 depicts the retractable furniture caster system 100 as including four caster assemblies 102, it should be understood that the retractable furniture caster system 100 may include additional or fewer caster assemblies 102. In practice, the number of caster assemblies 102 included in the retractable furniture caster system 100 may depend on the number of furniture legs of the article of furniture and may be equal to the number of furniture legs. For instance, when the retractable furniture caster system 100 is used to improve the mobility of a three-legged table, the retractable furniture caster system 100 may include three caster assemblies 102, and when the retractable furniture caster system 100 is used to improve the mobility of a four-legged desk, the retractable furniture caster system 100 may include four caster assemblies 102. Examples of other furniture types with differing numbers of legs are contemplated herein as well.

Each caster assembly 102 includes a housing 104, a caster 106, and a push-pull cable 108. For instance, caster assembly 102*a* includes housing 104*a*, caster 106*a*, and push-pull cable 108*a*. Caster assembly 102*b* includes housing 104*b*, caster 106*b*, and push-pull cable 108*b*. Caster assembly 102*c* includes housing 104*c*, caster 106*c*, and push-pull cable 108*c*. And caster assembly 102*d* includes housing 104*d*, caster 106*d*, and push-pull cable 108*d*. As explained in further detail below in connection with FIGS. 2A-C and 3, the housing 104 of each caster assembly 102 is configured to mechanically couple to one of the legs of the article of furniture, the caster 106 of each caster assembly 102 is movably positioned within the housing 104, and the push-pull cable 108 of each caster assembly 102 is mechanically coupled to the caster 106. As used herein, "mechanically coupled" may refer to any means of attaching, securing, or fastening one object to another and may include either permanent or reversible means of doing so.

As further shown in FIG. 1, the retractable furniture caster system 100 may include an actuator assembly 110. As explained in further detail below in connection with FIG. 4, the actuator assembly 110 includes an actuator 112 mechanically coupled to the push-pull cables 108. In operation, when the actuator 112 is actuated, the actuator assembly 110 exerts a pushing force on the push-pull cables 108. The push-pull cables 108 transfer this pushing force to the casters 106, thereby pushing the casters 106 out of the housing 104 until the casters 106 are extended at least partially below the bottom surfaces of the furniture legs. In this extended configuration, the article of furniture may be rolled around on the casters 106. When the actuator 112 is no longer actuated, the actuator assembly 110 removes the pushing force exerted on the push-pull cables 108 (and in some examples may exert a pulling force on the push-pull cables 108). With the pushing force removed, the weight of the article of furniture and/or any pulling force exerted on the push-pull cables 108 by the actuator assembly 110 causes the casters 106 to retract back into the housing 104 and above the bottom surfaces of the furniture legs, thereby causing the furniture legs to contact the floor or ground surface and become stationary.

Figure 2A:
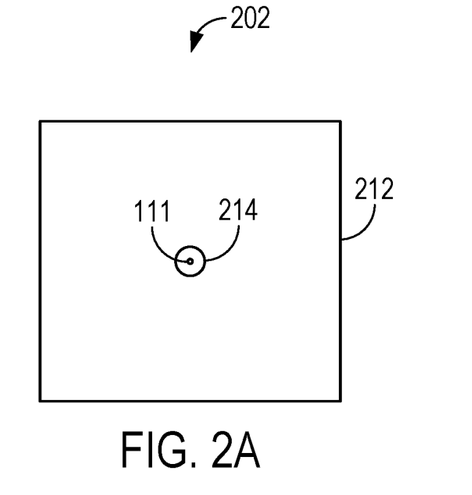
FIGS. 2A-2C depict, respectively, a top view, side view, and bottom view of a furniture caster assembly of the retractable furniture caster system of FIG. 1 according to an example embodiment.
Figure 2B:
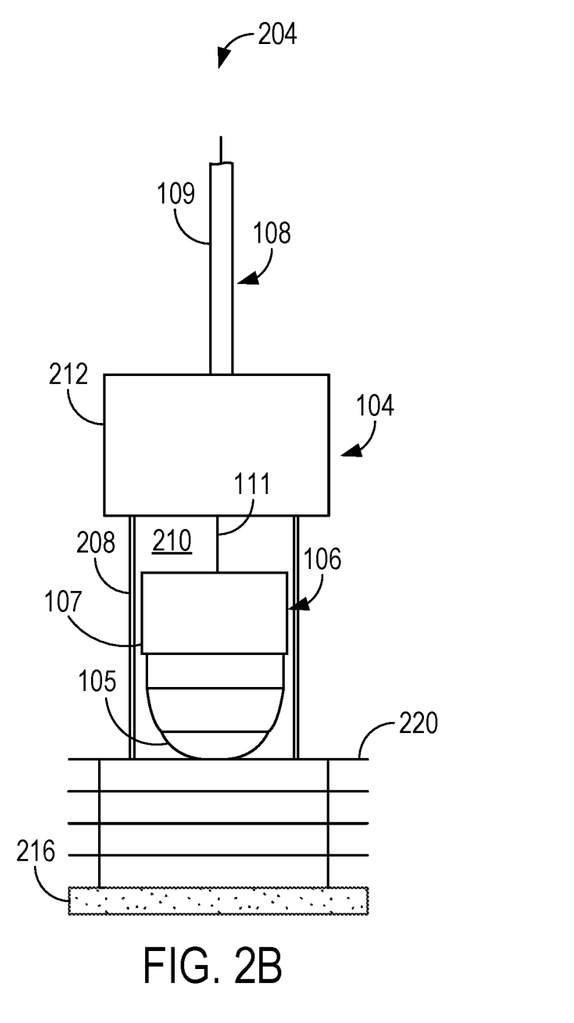
Figure 2C:
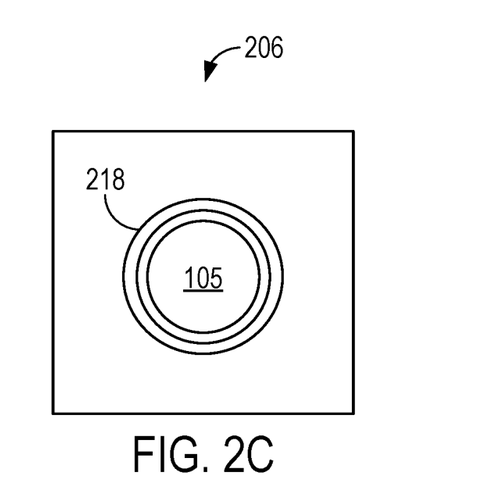
Figure 3:
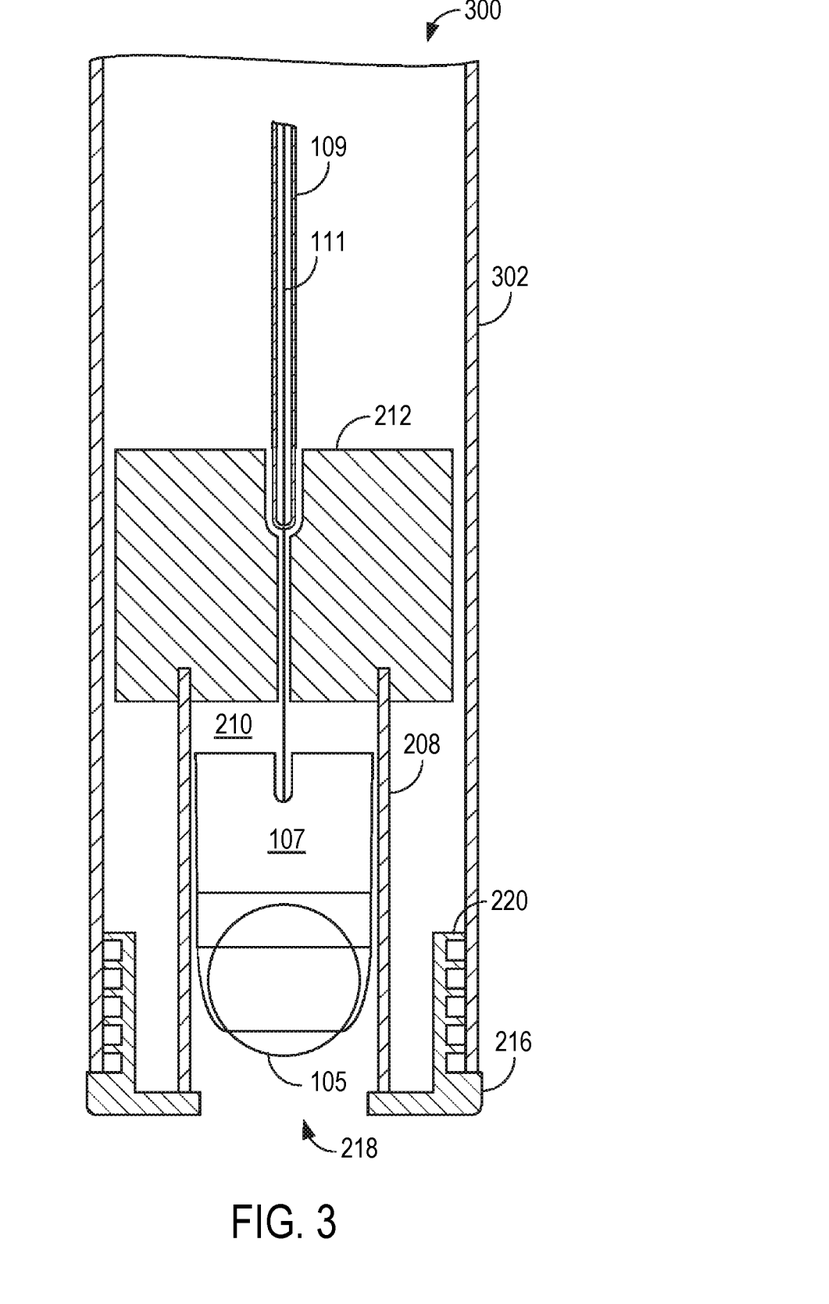
FIG. 3 depicts the furniture caster assembly of FIG. 2 installed into a furniture leg according to an example embodiment.

Turning now to FIGS. 2A-C and 3, the components of the caster assemblies 102 and their functions will now be explained in further detail. FIG. 2A depicts a top view 202 of one of the caster assemblies 102, FIG. 2B depicts a side view 204 of one of the caster assemblies 102, and FIG. 2C depicts a bottom view 206 of one of the caster assemblies 102, while FIG. 3 depicts a cutaway diagram 300 of one of the caster assemblies 102 that has been installed inside of a furniture leg 302.

As noted above, the caster assembly 102 includes a housing 104, and the caster 106 is movably positioned within the housing. To facilitate this, the housing 104 may include one or more sidewalls 208 that define an interior space 210 of the housing 104. The interior space 210 may be large enough to contain the caster 106, and the caster 106 may be movable within the interior space 210. For instance, the caster 106 may be unsecured to the housing 104 and may be capable of moving vertically within the interior space 210.

As further noted above, the caster 106 may move within the housing 104 due to the push-pull cable 108 exerting a force on the caster 106. For instance, the push-pull cable 108 may include an outer conduit 109 and a cable 111 housed within the conduit 109. The actuator 112, when actuated, may exert a pushing force on the cable 111, pushing the cable 111 through the conduit 109. The cable 111 may be mechanically coupled to the caster 106 such that, when the actuator 112 exerts the pushing force on the cable 111, the cable 111 transfers the pushing force to the caster 106. To facilitate this, one end of the housing 104 may include a cable receiving block 212. The conduit 109 may be fixed to the cable receiving block 212 (e.g., via a fitting of the push-pull cable 108 or the like), while the cable 111 may pass through an opening 214 in the cable receiving block 212 and mechanically couple to the caster 106. While the entire length of the push-pull cable 108 is not shown in FIGS. 2A-C and 3 for simplification purposes, it should be understood that the opposite end of the push-pull cable 108 that is not depicted in FIGS. 2A-C and 3 is mechanically coupled to the actuator assembly 110 as depicted in FIG. 1 and as described in further detail below in connection with FIG. 4.

As shown in FIG. 3 and in the bottom view 206 of the caster assembly 102, at the other end of the housing 104 opposite the cable receiving block 212, the housing 104 may include a foot 216 having an opening 218 through which at least a portion of the caster 106 may extend when pushed out of the housing 104. For instance, the caster 106 may include at least one rolling component 105 and a caster block 107, and the opening 218 may be configured to allow the rolling component 105 to pass through but not the caster block 107. The rolling component 105 may take various forms and may include a roller ball, a wheel, or any other rollable component that can be used for rolling articles of furniture. In order to allow the rolling component 105 to extend through the foot 216 of the housing 104, the opening 218 in the foot 216 may be larger than the rolling component 105 but smaller than the caster block 107. In this manner, the foot 216 of the housing 104 may allow the rolling component 105 to extend through the opening 218 out of the bottom of the housing 104 while blocking the caster block 107 and preventing the caster 106 from being pushed entirely out of the bottom of the housing 104.

As further noted above, each of the caster assemblies 102 may be configured to mechanically couple to a respective leg of the article of furniture. This coupling may be achieved in various ways. In some examples, the caster assemblies 102 may be configured to be inserted inside the furniture legs. For example, as shown in FIG. 2B, the housing 104 of the caster assembly 102 may include protruding fins 220. An outside diameter of the fins 220 may be larger than an inside diameter of an interior space of the furniture leg such that, when the caster assembly 102 is inserted into the furniture leg, the fins 220 are compressed against the interior of the furniture leg and held in place by friction. However, this example is merely illustrative, and other mechanical coupling techniques are contemplated herein as well. For instance, the caster assembly 102 may be coupled to the furniture leg using any attaching, securing, or fastening techniques apparent to a person of ordinary skill in the art. Further, the caster assembly 102 need not be inserted into an interior portion of the furniture leg but may alternatively be coupled to an outside portion of the furniture leg.

Figure 4:
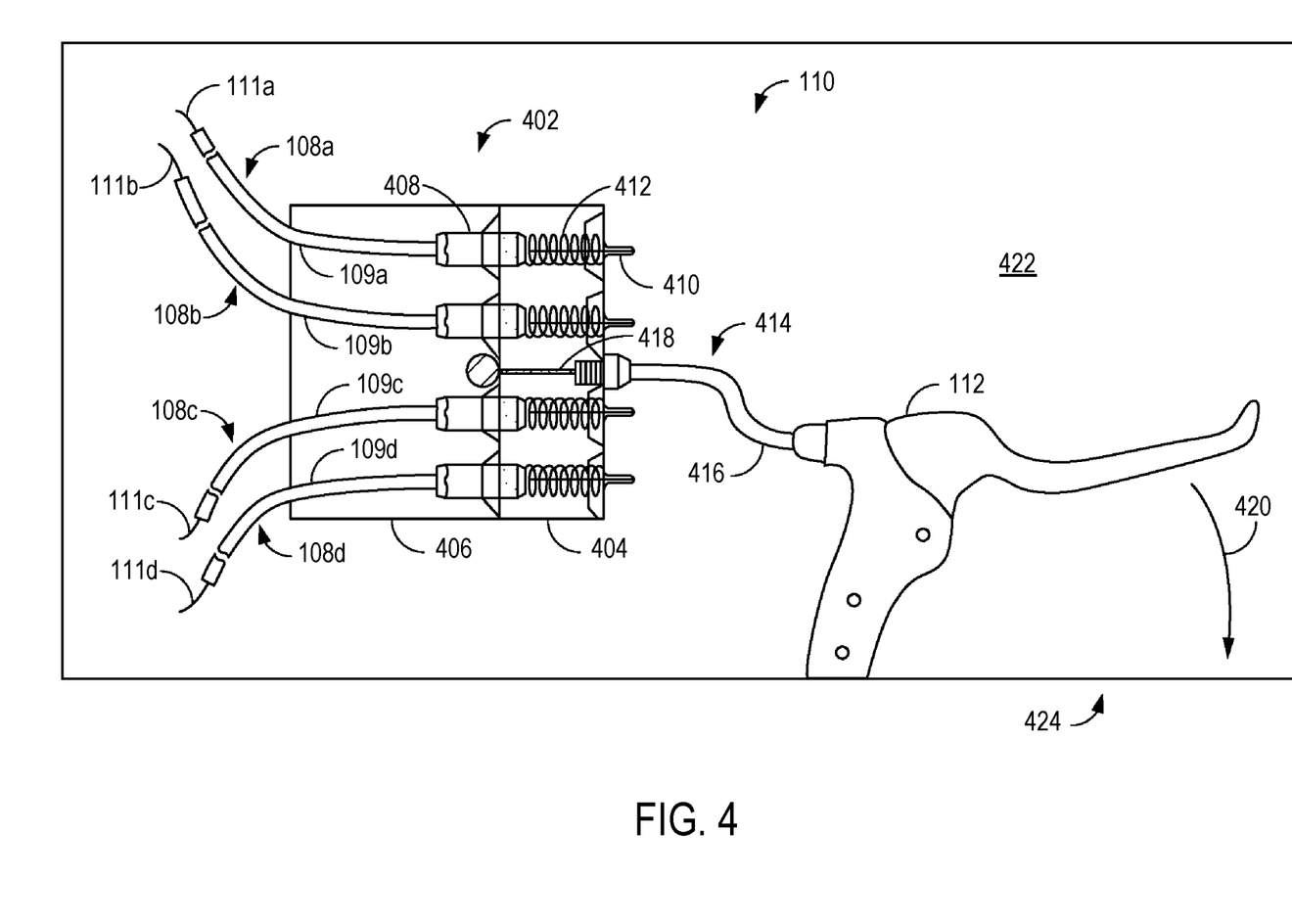
FIG. 4 depicts an actuator assembly of the retractable furniture caster system of FIG. 1 according to an example embodiment.

Turning now to FIG. 4, the components of the actuator assembly 110 and their functions will now be explained in further detail. As noted above, the actuator assembly 110 includes an actuator 112 that is mechanically coupled to the push-pull cables 108. In line with the discussion above, the push-pull cables 108 may include an outer conduit portion 109 and an inner cable portion 111 configured to slide through the conduit 109. In particular, push-pull cable 108a may include outer conduit 109a and inner cable 111a, push-pull cable 108b may include outer conduit 109b and inner cable 111b, push-pull cable 108c may include outer conduit 109c and inner cable 111c, and push-pull cable 108d may include outer conduit 109d and inner cable 111d. While the entire lengths of the push-pull cables 108 are not shown in FIG. 4 for simplification purposes, it should be understood that the opposite ends of the push-pull cables 108 that are not depicted in FIG. 4 are mechanically coupled to the caster assemblies 102 as described above in connection with FIGS. 1-3.

In order to mechanically couple the actuator 112 to the push-pull cables 108, the actuator assembly 110 may include a cable push block 402. The push block 402 includes a fixed portion 404 and a slidable portion 406. The fixed portion 404 may be immovably affixed to the article of furniture, for example to an underside of the furniture, and the slidable portion 406 may be movably coupled to the fixed portion 404 and configured to slide along a single axis relative to the fixed portion 404. The outer conduit 109 of the push-pull cables 108 may be affixed to the slidable portion 406 of the cable push block 402, for instance, via fittings 408 of the push-pull cables 108. The inner cables 111 of the push-pull cables 108 may extend through the fittings 408 and be affixed to the fixed portion 404 of the push block 402 at respective terminals 410. The terminals 410 may be separated from the fittings 408 by one or more springs 412.

In operation, the actuator 112 may be configured to pull the slidable portion 406 of the push block 402 such that the fittings 408 are pulled toward the terminals 410. This pulling motion on the fittings 408 (and consequently on the outer conduit portions 109 of the push-pull cables 108) effects a pushing force on the inner cables 111 of the push-pull cables 108. And because the opposite ends of the inner cables 111 are coupled to the casters 106 of the caster assemblies 102, this pushing force is transferred to the casters 106, thereby causing the casters 106 to transition from a retracted position to an extended position as described above. Conversely, when the actuator 112 is released or otherwise no longer actuated, the springs 412 push the slidable portion 406 and the fittings 408 back to their previous position. This pushing motion on the fittings 408 (and consequently on the outer conduit portions 409 of the push-pull cables 108) effects a pulling force on the inner cables 111 of the push-pull cables 108. Likewise, because the opposite ends of the inner cables 111 are coupled to the casters 106 of the caster assemblies 102, this pulling force is transferred to the casters 106, thereby causing the casters 106 to transition from the extended position to the retracted position as described above.

In order for the inner cables 111 to effectively transfer the pushing force to the casters 106, the inner cables 111 may be designed to withstand a sufficient amount of compressive force without buckling. The sufficient amount of compressive force may vary across different applications. Namely, the sufficient amount of compressive force may depend on both the weight of the article of furniture and the number of furniture legs. For instance, consider an example in which the retractable furniture caster system 100 described herein is integrated into a four-legged table weighing one hundred pounds. Assuming a uniform weight distribution, in order to push the casters 106 into the extended position and lift the table off the ground, each of the casters 106 and their attached inner cables 111 would have to be capable of supporting, at a minimum, twenty-five pounds of force (i.e., one fourth of the table weight, which is distributed across the four casters 106 in the four table legs). As such, when determining which materials to use for the inner cables 111, one should consider the amount of force that the inner cables 111 will be subjected to. For heavier furniture, it may be desirable to use higher tensile strength materials for the inner cables 111, such as solid core steel cables. Whereas, for lighter furniture, lower tensile strength materials, such as braided metals, may be used.

The actuator 112 may take various forms and may be configured to pull the slidable portion 406 of the push block 402 in various ways. As shown in FIG. 4, the actuator 112 may include a handle that acts as a lever. The handle may be coupled to one end of yet another push-pull cable 414 having an outer conduit 416 affixed to the fixed portion 404 of the push block 402 and an inner cable 418 affixed to the slidable portion 406 of the push block 402. In this manner, when the handle is pulled in the direction shown by arrow 420, the handle exerts a pulling force on the inner cable 418 and thus also on the slidable portion 406 of the push block 402.

As further shown in FIG. 4, the actuator assembly 110 may be affixed to an underside 422 of an article of furniture so that the actuator assembly 110 remains out of sight, thereby preserving the aesthetic effect of the furniture. Likewise, the push-pull cables 108 may be routed to the respective legs of the article of furniture along the underside 422 of the furniture. Upon reaching the furniture legs, the push-pull cables 108 may be respectively routed into interior portions of the furniture legs (e.g., through respective openings in the legs). The push-pull cables 108 may be further routed inside the legs through the interior portions and down to the respective caster assemblies 102 where the cables 108 may be mechanically coupled to the housings 104 and the casters 106 of the caster assemblies 102 as described above in connection with FIGS. 1-3.

Additionally, the actuator 112 may be positioned on the underside 422 of the furniture such that the handle of the actuator 112 is near an edge 424 of the article of furniture. The edge 424 may be an edge that is typically gripped by a person when moving the article of furniture, and the handle may be positioned close enough to the edge 424 so that when a person grips the edge 424, the person may concurrently grip the handle of the actuator 112. For instance, the handle may be positioned within one to three inches of the edge 424 of the furniture, but other examples are possible as well. With such an arrangement, a person can grab the handle and actuate the actuator 112 using the same or similar grip that the person would otherwise use to manually lift or move the furniture without the assistance of the retractable furniture caster system 100.

II. Other Design Considerations

Various aspects of the retractable furniture caster system 100 described herein may take different forms than those described above. For instance, in some examples, the actuator 112 may take the form of an electric motor such as a DC motor, an AC motor, a servo motor, a linear motor, or a stepper motor. In such examples, the motor may be coupled to a power supply, such as a battery or a wall power outlet.

The motor may be configured to function in a similar manner as the manual actuator depicted in FIG. 4. For instance, the motor may be mechanically coupled, for instance via a gearbox or the like, to the slidable portion 406 of the cable push block 402. When activated (e.g., by supplying power to the motor), the motor may pull the slidable portion 406 of the push block 402, thereby pushing the inner cables 411 through the conduit 409, causing the casters 106 to extend through the bottom of the housing 104, and lifting the furniture legs off the ground.

In other examples, the motor may be one of multiple motors that function differently than the manual actuator depicted in FIG. 4. For instance, in some examples, the retractable furniture caster system 100 may include a separate electric motor for each respective furniture leg of the article of furniture. Each motor may be mechanically coupled, for instance via a gearbox, to one of the caster assemblies 102. When a given motor is activated (e.g., by supplying power to the motor), the motor may generate a linear actuation force on the caster 106 in the coupled caster assembly 102 that causes the caster 106 to extend through the bottom of the housing 104 and lift the furniture leg off the ground. The multiple motors, each positioned in a different furniture leg, may be coupled to the same activation source (e.g., a single switch that controls power to the motors) so that the motors can be activated concurrently to lift all of the furniture legs off of the ground. Other example design variations are possible as well.

III. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "persons," "humans," "operators," "users," or other entities, this is for purposes of example and explanation only. The claims should not be construed as requiring action by such actors unless explicitly recited in the claim language.

What is claimed is:
1. A system comprising:
a plurality of furniture caster assemblies, each furniture caster assembly of the plurality of furniture caster assemblies respectively comprising:
a housing comprising (i) one or more side walls defining an interior space of the housing and (ii) a foot extending from at least one side wall of the one or more side walls to create an opening of the housing, wherein the housing is configured to mechanically couple to a respective furniture leg of an article of furniture comprising a plurality of furniture legs;
a furniture caster comprising a caster block and at least one rolling component, wherein the furniture caster is positioned at least partially within the interior space of the housing and movable between (i) an extended position in which the at least one rolling component at least partially extends outside of the interior space of the housing via passing through the opening of the housing and (ii) a retracted position in which the furniture caster is retracted further into the interior space of the housing relative to the extended position, wherein the opening of the housing is larger than the at least one rolling component and smaller than the caster block, such that when the furniture caster is extended outside of the interior space of the housing, the caster block prevents the furniture caster from extending beyond the extended position; and
a push-pull cable mechanically coupled to the furniture caster; and
at least one actuator mechanically coupled to the push-pull cables, wherein the at least one actuator is configured to (i) when actuated, apply a pushing force to the push-pull cables, thereby causing the furniture casters to transition from the retracted position to the extended position and (ii) when not actuated, remove the applied pushing force from the push-pull cables, thereby causing the furniture casters to transition from the extended position to the retracted position.

2. The system of claim 1, wherein the at least one actuator comprises a single actuator mechanically coupled to each of the push-pull cables.

3. The system of claim 1, wherein the at least one actuator comprises a handle, and wherein actuating the at least one actuator comprises actuating the handle.

4. The system of claim 1, wherein the housing is configured to be at least partially inserted into an interior portion of the respective furniture leg.

5. The system of claim 1, wherein each respective housing of the plurality of furniture caster assemblies is coupled to a respective furniture leg of the plurality of furniture legs of the article of furniture, each respective furniture leg of the plurality of furniture legs comprising a respective bottom surface configured to interface with a floor or ground surface, wherein, while the furniture casters are in the extended position, the at least one rolling component of each of the furniture casters at least partially extends below the respective bottom surfaces of the plurality of furniture legs, and wherein, while the furniture casters are in the retracted position, the at least one rolling component of each of the furniture casters is positioned entirely above the respective bottom surfaces of the plurality of furniture legs.

6. The system of claim 1, wherein the article of furniture comprises an underside from which the plurality of furniture legs extends, and wherein the at least one actuator is configured to mechanically couple to the underside of the article of furniture.

7. The system of claim 1, wherein each of the push-pull cables of the plurality of furniture caster assemblies is configured to be routed through a respective interior portion of a respective furniture leg of the article of furniture.

8. The system of claim 1, wherein the at least one rolling component comprises a roller ball or a wheel.

9. The system of claim 1, wherein the foot extends orthogonally from the at least one side wall of the one or more side walls.

10. The system of claim 4, wherein the housing further comprises a plurality of fins configured to compress against the interior portion of the respective furniture leg when the housing is at least partially inserted into the interior portion of the respective furniture leg to couple the housing to the interior portion of the respective furniture leg.

11. An article of furniture comprising:
a plurality of furniture legs each comprising a respective bottom surface configured to interface with a floor or ground surface;
a plurality of furniture caster assemblies, each furniture caster assembly of the plurality of furniture caster assemblies respectively comprising:
a housing comprising (i) one or more side walls defining an interior space of the housing and (ii) a foot extending from at least one side wall of the one or more side walls to create an opening of the housing, wherein the housing is mechanically coupled to a respective furniture leg of the plurality of furniture legs;
a furniture caster comprising a caster block and at least one rolling component, wherein the furniture caster is positioned at least partially within the interior space of the housing and movable between (i) an extended position in which the at least one rolling component at least partially extends below the respective bottom surface of the respective furniture leg via passing though the opening of the housing and (ii) a retracted position in which the at least one rolling component is positioned entirely above the respective bottom surface of the respective furniture leg, wherein the opening of the housing is larger than the at least one rolling component and smaller than the caster block, such that when the furniture caster extends below the respective bottom surface of the respective furniture leg via passing through the opening of the housing, the caster block prevents the furniture caster from extending beyond the extended position; and
a push-pull cable mechanically coupled to the furniture caster; and
at least one actuator mechanically coupled to the push-pull cables, wherein the at least one actuator is configured to (i) when actuated, apply a pushing force to the push-pull cables, thereby causing the furniture casters to transition from the retracted position to the extended position and (ii) when not actuated, remove the applied pushing force from the push-pull cables, thereby causing the furniture casters to transition from the extended position to the retracted position.

12. The article of furniture of claim 11, wherein the at least one actuator comprises a single actuator mechanically coupled to each of the push-pull cables.

13. The article of furniture of claim 11, wherein the at least one actuator comprises a handle, and wherein actuating the at least one actuator comprises actuating the handle.

14. The article of furniture of claim 11, wherein each respective housing of the plurality of furniture caster assemblies is positioned within a respective interior portion of a respective furniture leg of the plurality of furniture legs.

15. The article of furniture of claim 11, further comprising an underside from which the plurality of furniture legs extends, wherein the at least one actuator is mechanically coupled to the underside of the article of furniture.

16. The article of furniture of claim 11, wherein each of the push-pull cables of the plurality of furniture caster assemblies is routed through a respective interior portion of a respective furniture leg of the plurality of furniture legs.

17. The article of furniture of claim 11, wherein the at least one rolling component comprises a roller ball or a wheel.

18. The article of furniture of claim 11, wherein the article of furniture comprises a table, a chair, a desk, a cabinet, a dresser, a bookcase, or a bed.

19. The article of furniture of claim 11, wherein the foot extends orthogonally from the at least one side wall of the one or more side walls.

20. The article of furniture of claim 14, wherein each respective housing further comprises a plurality of fins that compress against the respective interior portion of the respective furniture leg of the plurality of furniture legs to couple the respective housing to the respective interior portion of the respective furniture leg.

* * * * *